Aug. 15, 1939   A. A. THOMAS   2,169,668
BRAKE MECHANISM FOR AUTOMOTIVE VEHICLES
Filed Dec. 1, 1936
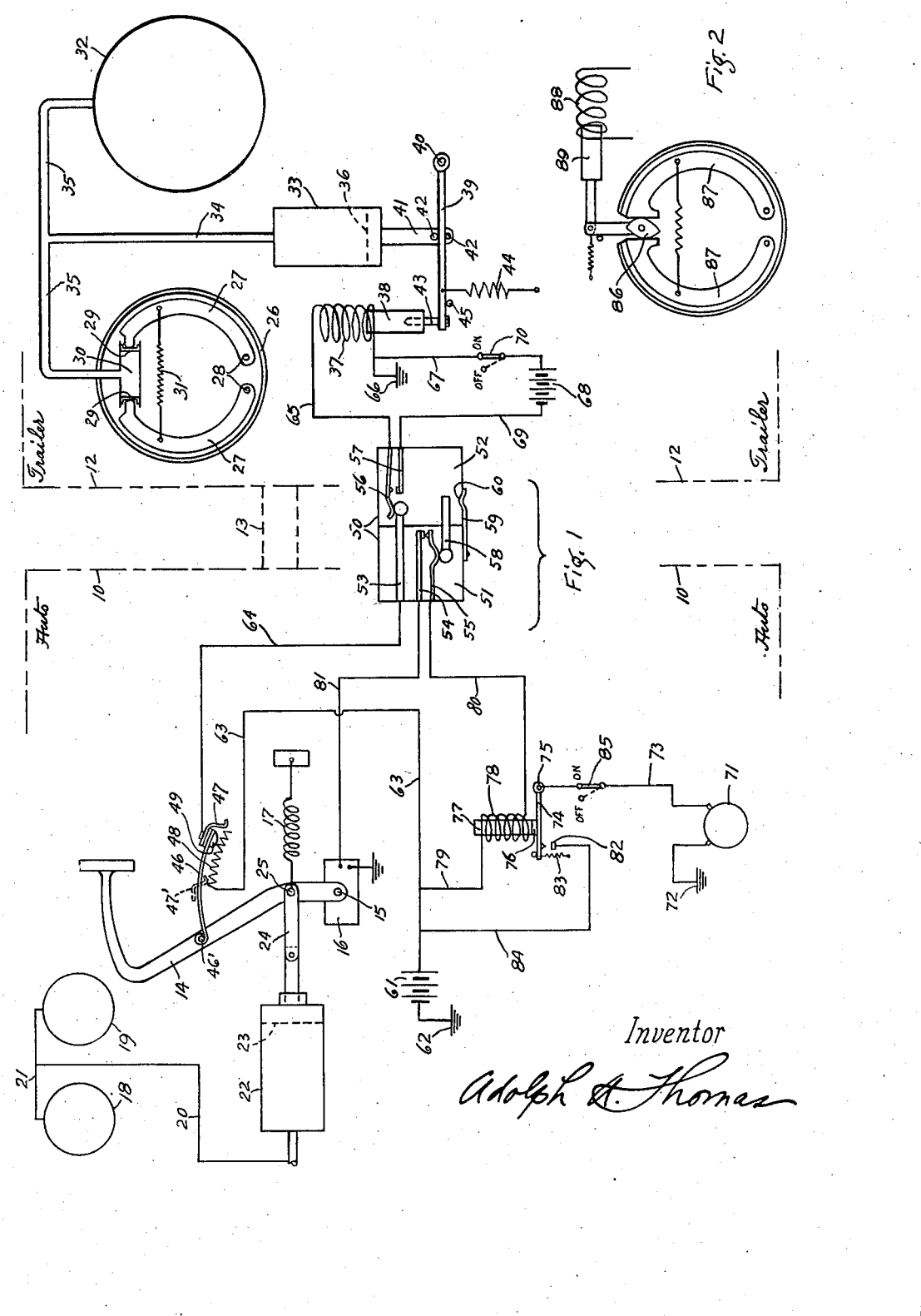
Inventor
Adolph A. Thomas Patented Aug. 15, 1939

2,169,668

UNITED STATES PATENT OFFICE 2,169,668

BRAKE MECHANISM FOR AUTOMOTIVE VEHICLES

Adolph A. Thomas, New York, N. Y.

Application December 1, 1936, Serial No. 113,536

6 Claims. (Cl. 188—3)

My invention relates to motor vehicles and its object is to provide automatic brake mechanism for the trailers of automobiles whereby the trailer is always braked in unison with the driving car. That is to say, the mere operation of the usual brake pedal or lever on the car ahead automatically operates the brakes on the trailer coupled behind, so that the two vehicles can be driven safely at any practical speed.

The recent rage in trailers for passenger cars has induced manufacturers to turn out trailers of considerable size and weight, some models being veritable houses on wheels. While automobiles with their high-powered engines can easily pull these trailers, the brakes on the cars cannot long stand the additional load imposed upon them by the trailer. Even at moderate speed, the slowing down or stopping of the driving car, especially when done suddenly, causes the momentum of the unbraked trailer to inflict tremendous strains not only on the brakes of the car but also on the coupling between the two vehicles. The dangers of such a condition are obvious: the brakes on the automobile will not be able to stop the coupled vehicles quickly in an emergency, and the undue strains thus placed upon the coupling may cause the latter to be torn asunder. An unbraked trailer that becomes uncoupled may entail the loss of human life.

It is the purpose of this invention to eliminate the above dangers by providing the trailer with brake mechanism which is automatically operated in unison with the brakes on the automobile. The driver of the car pays no attention to the trailer brakes, for the mere operation of the brake pedal or lever on the car automatically causes the trailer brakes to repeat the action of the auto brakes. In a preferred form of my invention the variable pressures applied to the auto brakes are automatically duplicated in the trailer brakes, so that the trailer always slows down or stops synchronously with the car ahead as if it were an independent vehicle. This operation imposes no extra strain on the coupling and the brakes of the car. The brake control connections between the coupled vehicles are preferably electric, whereby simplicity of construction and certainty of operation are achieved.

According to another feature of my invention, the accidental uncoupling of the trailer automatically puts the trailer brakes on full, so that the trailer stops almost instantly even on a hill, thereby preventing fatalities. At the same time the uncoupling of the trailer automatically sets off a signal in front of the driver, such as a red light or a bell, so that the driver can stop the car and return to the trailer.

The various novel features and practical advantages of my invention will be understood from a description of the accompanying drawing, in which Fig. 1 illustrates diagrammatically an electric system for automatically operating the brakes on a trailer in unison with the brakes on the driving car; and Fig. 2 is a detached view of a mechanical trailer brake operated electrically.

The dotted outlines 10 and 12 represent a motor vehicle and a trailer coupled together at 13. These parts are indicated in a diagrammatic way only, for any type or construction of motor car, trailer and coupling may be used. For the purpose of description we may assume the part 10 to be a passenger automobile and the part 12 to be a trailer fitted out for housekeeping while travelling. The coupling 13 may be of any practical design, usually including a swivel joint, and it will not be necessary to show or describe any details thereof, since they form no part of this invention.

The automobile 10 has the usual brake pedal 14 pivoted at 15 to a convenient part 16 of the chassis. A coil spring 17 normally holds the pedal 14 raised and returns it from depressed or braking position upon release. I have assumed that the motor car 10 has hydraulic brakes of the conventional type, indicated diagrammatically at 18 for the front brakes and at 19 for the rear brakes. Oil piping 20—21 leads from the master oil cylinder 22 to the hydraulic actuating mechanism of each brake, as will be understood by those familiar with such devices. The piston 23 operating in cylinder 22 is suitably connected to the brake pedal 14, this connection being indicated for simplicity by a link 24 pivoted to the pedal at 25. When the pedal 14 is pushed down, the piston 23 forces oil into the hydraulic brakes 18—19, this pressure increasing with the downward movement of the pedal. I need not say anything more about the construction and operation of the brakes controlled by pedal 14, because that is a matter of common knowledge among those familiar with the technical side of automobiles.

The wheels of the trailer 12 are also equipped with brakes, either hydraulic or mechanical, both forms being shown in the drawing by way of example. In Fig. 1 each hydraulic brake comprises a drum 26, a pair of brake shoes 27 pivoted to the drum at 28, and a pair of pistons 29 movable in a small oil cylinder 30 for spreading the brake shoes, which are retracted to inoperative position by a coil spring 31. This simplified brake construction is intended to be illustrative of any practical form of hydraulic brake, and may be considered applicable to the brakes 18—19 on the car 10. The circular outline 32 is supposed to be a duplicate of the brake mechanism just described, and there are as many brakes on the trailer as safety requires, preferably one for each wheel and certainly one for each rear wheel. A master cylinder 33 on the trailer supplies oil or other suitable liquid through piping 34—35 to the individual brake cylinders 30, so that the pistons 29 of all brakes are operated simultaneously and at equal pressures when the piston 36 is pushed into its cylinder. The pressure of the brake shoes 27 against their respective drums 26 depends upon the force actuating the piston 36.

A solenoid coil 37, suitably supported on the trailer, has a movable magnetic core or plunger 38 connected to the free end of an arm 39, which is pivoted at 40 to any convenient part of the trailer frame. The piston rod 41 is connected to arm 39 in any practical way, as by means of a pair of spaced pins or lugs 42, which may carry small antifriction rollers. The same form of connection may be used between the extension 43 of plunger 38 and the arm 39. A contracting coil spring 44 normally holds the arm 39 against a fixed stop 45, so that the piston 36 and solenoid core 38 are normally in outermost or inoperative position. When the coil 37 is energized (as presently to be explained), it draws in the magnetic plunger 38 and thereby actuates the arm 39 to force the piston 36 farther into the oil cylinder 33. As a result, oil is driven into the brake cylinders 30 to press the shoes 27 against the drum, and the shoes are held in braking position as long as coil 37 remains energized. Upon de-energization of the coil, spring 44 instantly restores the parts to normal position, as shown, thereby releasing the brake shoes.

The braking pressure exerted by the actuated shoes 27 depends upon the strength of the electric current that energizes coil 37, so that by controlling this current strength it is possible to control the variable operation of the trailer brakes. I shall presently describe means for doing that automatically by the variable braking movements of pedal 14 on the driving car. When coil 37 is first energized, the initial shock imposed on arm 39 by the sudden inward pull of core 38 is absorbed or cushioned by the dash-pot action of piston 36 in cylinder 33, and I may supplement that cushioning effect by making the cylindrical core 38 operate in the coil like the piston of a dash-pot. Or, the steel arm 39 may be slightly flexible at its free end to absorb the initial jerk exerted on the arm when the current first surges through coil 37. In fine, the electromagnetic actuating mechanism for the brake piston 36 is so constructed that it produces a smooth movement of the piston and therefore of the brake shoes 27.

I will now describe the electric connections for automatically controlling the brake coil 37 on the trailer by the movements of brake pedal 14 on the automobile. An arm 46 carrying an insulated contact 47 is operatively connected with pedal 14, and for convenience of illustration I have shown the arm mounted directly on the pedal, as indicated at 46'. A stationary resistance coil 48 is suitably supported so as to be engaged by the slidable contact 47 when the brake pedal 14 is operated; this contact being preferably a spring piece with a rounded end adapted to slide easily over the resistance element 48. The supporting arm 46 may be a spring finger which holds the contact 47 pressed against the member 48 during the rocking movements of pedal 14. In the normal or inoperative position of the pedal, as shown in Fig. 1, the contact piece 47 is out of engagement with resistance element 48, whereby the circuit of the rheostat is normally open. An insulated button 49 or the like on the underside of arm 46 rests on the resistance 48 to hold the arm away from the resistance when the contact 47 is in neutral position. If the arm 46 itself is of insulating material, the insulated piece 49 is not needed. When the pedal 14 is fully depressed, the contact 47 is in position 47' at the other end of the resistance member 48, which is now shorted or at minimum ohmic value, as will more clearly appear when I describe the electric circuits. In the broad aspect of my invention, any practical form of rheostat may be used, and the contact 47 may be operatively connected with any suitable part that moves in synchronism with the brake pedal 14.

Between the automobile 10 and the coupled trailer 12 there is an electric plug 50 which consists of two interfitting members 51—52 adapted to be pulled apart. These plug members may be molded of insulating material and are so shaped inside as to support a number of electric contacts. The plug member 51 carries three contacts 53, 54 and 55. The contact 53 is a short rod or stud projecting into plug member 52, and the contacts 54—55 constitute a normally open switch, the contact 55 being a spring finger normally out of engagement with contact 54. The other plug member 52 carries two switch contacts 56—57 and an insulated peg or stud 58 arranged to project into plug member 51. The contact 56 is a spring finger normally in pressure engagement with contact 57, so that the contacts 56—57 constitute a normally closed switch. When the plug members 51—52 are fitted together, the rounded head of contact rod 53 strikes the free end of spring finger 56 and forces it away from contact 57. At the same time the head of the insulated peg 58 engages the spring finger 55 and holds it pressed against the contact 54. In other words, as long as the plug members 51—52 remain assembled, the switch 54—55 remains closed, the switch 56—57 remains open, and the engaging contacts 53 and 56 form a closed switch. When the plug sections 51—52 are pulled apart, the contacts 53 and 56 break circuit, switch arm 55 springs open, and switch arm 56 snaps closed. The plug sections 51—52 may be held together with sufficient frictional force by the engagement of the rigid pins 53 and 58 with the spring fingers 56 and 55, if the engaging surfaces are properly shaped. Otherwise, a releasable friction lock may be provided to keep the plug sections 51—52 firmly together until a predetermined separating force is applied. For example, one or more spring latches 59 attached to one plug section engage in notches 60 in the other section. A sudden jerk on the assembled plug sections (as when the coupling 13 breaks) causes them to separate and dangle from their cords, the member 51 remaining on the automobile and the member 52 on the trailer.

A source of electric energy 61 on the automobile may be the storage battery or the generator, and for convenience I shall refer to it as a battery. One side of battery 61 is grounded at 62 to the metal frame of the car and the other side is connected by conductor 63 to one end of the rheostat resistance 48. A wire 64 connects the insulated rheostat contact 47 with jack 53 in plug member 51, and a wire 65 on the trailer connects the switch contact 56 in plug member 52 with one end of the solenoid coil 37, the other end of this coil being grounded at 66. It is to be understood that the two grounded points 62 and 66 on the automobile and trailer are electrically connected through the metal structure of the coupled vehicles. If that is not found practical in any particular case, the points 62 and 66 are electrically connected by a separate wire. The grounded side of coil 37 is connected by conductor 67 to one side of a battery 68 on the trailer, and the other side of this battery is connected by conductor 69 to switch contact 57 in plug member 52. The conductor 67 may include a suitable hand switch 70, which is closed before the trailer starts on a journey and is left open to save current when the trailer is not in use as a conveyance. It should be noted that neither side of battery 68 is grounded, so that the grounded point 66 of coil 37 has nothing to do with the trailer battery but only with the grounded battery 61 on the driving car. The reason for this will be clear when I describe the operation of the system.

In a convenient place near the driver of the car there is mounted a suitable alarm signal 71, which may be audible or visible, such as a red light or a small electric bell or a combination of the two. If a lamp signal is used, it may be mounted on the instrument panel in front of the driver. One side of the electric signal 71 is grounded at 72 and the other side is connected by conductor 73 to a movable switch arm 74 pivotally supported at 75. The arm 74 may either be a magnetic bar or carry an armature 76 arranged to be held against the magnetic core 77 of coil 78 when the latter is energized. One end of coil 78 is connected by wire 79 to conductor 63 or otherwise to one side of battery 61, and the other end of the coil goes to the movable switch member 55 by way of conductor 80. The contact 54 in plug member 51 is grounded, as indicated by wire 81 which is connected to the grounded part 16 of the auto chassis. A switch contact 82 is associated with the movable arm 74, which is held against the contact by a spring 83 or otherwise when the coil 78 is not energized. A conductor 84 connects the contact 82 to one side of battery 61. Preferably a hand switch 85 is inserted in conductor 73, so that the alarm signal 71 can be thrown out of circuit when not needed. While the alarm signal 71 is not absolutely necessary, it is a good thing to have, as presently will be understood.

In actual practice the three wires 64—80—81 connected to plug member 51 are preferably made into a single cable, and the same applies to the two wires 65—69 connected to the other plug member 52. These two cables constitute flexible cords between which the assembled plug sections 51—52 are suspended with sufficient play to take care of all relative movements between the coupled vehicles during travel. It is only when the trailer happens to break away that the plug sections 51—52 are pulled apart, and then each plug section dangles from its cable. Only a short length of the cables need be free for that purpose.

The automatic trailer brake system above described operates as follows: As long as the trailer 12 is coupled to the driving car 10, the plug members 51—52 remain assembled and form an electric coupling or controlling connection between the brake pedal 14 of the car and the brakes of the trailer. When the pedal 14 is in normal or inoperative position, the rheostat contact 47 is out of engagement with resistance element 48, so that the coil 37 on the trailer remains de-energized and the trailer brakes are off, the same as the auto brakes. When the driver presses down on pedal 14 to operate the car brakes 18—19, the first movement of the pedal carries the contact 47 into engagement with the adjacent end of resistance 48, whereby the circuit of coil 37 on the trailer is closed as follows: Battery 61, wire 63, resistance 48, contact 47, wire 64, closed contacts 53 and 56 in plug 50, wire 65, coil 37, and to the grounded side of battery 61. The energized coil 37 pulls in the plunger 38, which actuates the arm 39 and thereby forces the piston 36 inwardly. As a result the brake shoes 27 are hydraulically actuated to braking position.

It should be noted that a slight movement of pedal 14 from normal position leaves most of the resistance 48 in the circuit of coil 37, so that the energizing current is at minimum strength and causes the piston 36 to exert a correspondingly low hydraulic pressure against the brake shoes 27. When the brake pedal 14 is pushed in to final position, as when the brakes 18—19 are to be put on at full strength, the rheostat contact 47 is in position 47' where it cuts out the resistance 48 and permits the full strength of the energizing current to pass through coil 37. In that case the piston 36 is forced into its cylinder at maximum pressure and the brake shoes 27 function at maximum braking power. In all intermediate positions of brake pedal 14 the movable contact 47 so adjusts the value of resistance 48 in circuit that the variable pressures applied by the driver to the car brakes 18—19 are automatically duplicated in the trailer brakes by means of coil 37 and the associated mechanism. That is to say, the variable braking movements imparted to piston 23 by means of pedal 14 are automatically transmitted to the braking piston 36 on the trailer, so that the trailer brakes operate as smoothly as the auto brakes. Since the plunger 38 of coil 37 acts upon piston 36 through increased leverage, the strength of the energizing current in the coil need not be very great.

It will be clear from the preceding description that the brakes on the trailer always operate automatically in unison with the auto brakes, not only as to time but also as to the variable braking effects applied by the driver. This unitary operation of the auto brakes and trailer brakes relieves the coupling 13 and the auto brakes 18—19 of undue strains in the slowing down and stopping of the vehicles, so that the coupled vehicles (no matter how heavy the trailer) can be stopped as easily as a single automobile. This is essential to the safe operation of trailered cars on highways.

There is another danger in the operation of automobile trailers, and that is the danger of the trailer breaking loose. No matter how strong the coupling between the vehicles may be, there is always the possibility of the coupling becoming accidentally disabled, especially with heavy trailers. If that should happen on a sloping highway, the runaway trailer would not only endanger the lives of its occupants but would be a meance to other vehicles. To avoid such disasters my invention provides means for automatically stopping the trailer when it becomes disconnected. Should the coupling 13 break or separate, the plug members 51—52 are pulled apart, so that switch 56—57 instantly closes and switch 54—55 opens. The closing of switch 56—57 closes the circuit of battery 68 through coil 37, which is thus energized to full strength and causes the brake shoes 27 to be applied at maximum pressure. The trailer is therefore stopped almost at once and is held safely braked even on a slope, so that no danger results. At the same time the opening of switch 54—55 de-energizes coil 78, thereby releasing the switch arm 74 which is pulled against the contact 82 and closes the circuit of the alarm signal 71. The driver of the car is thus instantly notified of the trailer's breaking loose, so that the car will not go on without the trailer, as might otherwise happen. The signal 71 thus acts as an automatic check on the condition of coupling 13. The brakes of the uncoupled trailer can be released by simply opening the hand switch 70.

The automatic braking operations above described are the same with mechanical brakes. Thus, if brakes like that shown in Fig. 2 are used, the pedal 14 on the car operates the cam 86 to spread the brake shoes 87, as will be understood without further explanation. On the trailer brakes the cam 86 is operated by a solenoid coil 88 and its plunger 89. What has been said about coil 37 applies to coil 88. When the auto brakes are set by the emergency brake lever, the automatic operation of the trailer brakes is the same as when the brake pedal 14 is pushed in to the limit. The particular construction of brake used on the car and its trailer is not material, it being understood that only brakes of approved type would be installed.

It will be seen from the foregoing explanation of my invention that I have provided comparatively simple mechanism for the automatic control of trailer brakes so as to make travel by trailer more safe. This mechanism is readily installed at little cost on any automobile and trailer, and its operation is reliable to the point of certainty, for there are no weak and delicate parts liable to break or get out of order. In referring to the vehicles 10 and 12 as an automobile and trailer assembly, I include not only passenger vehicles but any other practical kind of driving car and trailer. For example, the trailer may be a big moving van or other type of freight vehicle coupled to a driving truck which need be little more than an automotive chassis. In some cases there may be more than one trailer coupled in tandem to the driving vehicle, and each trailer will be controlled in the manner previously described for a single trailer.

Although I have shown and described a specific form of mechanism, my invention is not limited to the details set forth, for it embodies certain features of fundamental novelty and various modifications are possible within the scope of the appended claims.

I claim as my invention:

1. In an automobile and trailer assembly, the combination of hydraulic brake mechanism on each vehicle, a brake pedal on the automobile, and means for simultaneously operating both of said hydraulic brake mechanisms in response to the movements of said pedal, said brake-operating means including an electric connection between the coupled vehicles.

2. In an automobile and trailer assembly, the combination of hydraulic brake mechanism on each vehicle, a brake pedal on the automobile, and means for simultaneously operating both of said hydraulic brake mechanisms in response to the movements of said pedal, said brake-operating means including an electric connection between the coupled vehicles, said connection comprising two separable parts, one part being carried by the automobile and the other part by the trailer.

3. In a vehicle braking system, the combination of a brake, hydraulic means for operating said brake, said hydraulic means including an oil cylinder and a piston movable therein, a pivoted lever for actuating said piston into and out of braking position, a solenoid having a plunger connected to said lever in increased power ratio relatively to said piston, said solenoid being arranged adjacent to said cylinder on the same side of the pivoted lever, whereby a compact assembly is produced, and means for variably energizing said solenoid to regulate the working pressure of the brake.

4. In an automobile and trailer assembly, the combination of fluid-operated brake mechanism on each vehicle, a brake pedal on the automobile, a switch operated by said pedal, and means for simultaneously operating both of said brake mechanisms in response to the movements of said pedal, said means including a solenoid on the trailer energized by said switch and fluid power means controlled by said solenoid.

5. In an automobile and trailer assembly, the combination of fluid-operated brake mechanism on the automobile, a brake pedal on the automobile for controlling said mechanism, fluid-operated brake mechanism on the trailer including a power cylinder, a solenoid on the trailer for controlling said power cylinder, and a switch operated by said pedal for energizing said solenoid.

6. In an automobile and trailer assembly, the combination of fluid-operated brake mechanism on the automobile, a brake pedal on the automobile for controlling said mechanism, a switch operated by said pedal, fluid-operated brake mechanism on the trailer, and means for controlling said trailer brake mechanism by the operation of said pedal, said means including an electromagnetic device on the trailer energized by said switch and a hydraulic piston operatively associated with said device.

ADOLPH A. THOMAS.